United States Patent [19]
Baubron

[11] 4,442,353
[45] Apr. 10, 1984

[54] HIGH-PRECISION METHOD AND APPARATUS FOR IN-SITU CONTINUOUS MEASUREMENT OF CONCENTRATIONS OF GASES AND VOLATILE PRODUCTS

[75] Inventor: Jean-Claude C. Baubron, Sandillon, France

[73] Assignee: Bureau de Recherches Geologiques et Minieres, Paris, France

[21] Appl. No.: 275,164

[22] Filed: Jun. 19, 1981

[30] Foreign Application Priority Data

Jun. 20, 1980 [FR] France ................................ 80 13776

[51] Int. Cl.³ ................................ B01D 59/44
[52] U.S. Cl. ................................ 250/281; 250/282; 250/288
[58] Field of Search ............... 250/281, 282, 283, 288, 250/289

[56] References Cited

U.S. PATENT DOCUMENTS

| | | | |
|---|---|---|---|
| 2,610,300 | 9/1952 | Walton et al. | 250/288 |
| 2,721,270 | 10/1955 | Bennett | 250/289 |
| 3,895,231 | 7/1975 | Sodal et al. | 250/288 |

OTHER PUBLICATIONS

"Outer Planets Atmosphic Entry Probes: Science Obj. and Payloads", Myers, *Jour. of Spacecraft & Rockets*, vol. 13, No. 12, pp. 712-718, Dec. 1976.

"A Tech. for Fast and Reproducible Fingerprinting of Bacteria by Pyrolysis Mass Spect.", Meuzelaar et al., Anal. Chem., vol. 45, No. 3, Mar. 1973.

*Primary Examiner*—Bruce C. Anderson
*Attorney, Agent, or Firm*—Sughrue, Mion, Zinn, Macpeak, and Seas

[57] ABSTRACT

Continuous monitoring of variations in the concentrations of individual components in gaseous mixtures such as, more particularly, gases released from volcanic vents, is achieved in the field with consistently high precision, namely about 2 ppm, over extended periods of time, while the time lag for detecting a variation is minimized. On-site measurements are made with a portable apparatus, comprising a sampling probe from which the gas is led to an expansion enclosure maintained at a regulated pressure of about $10^{-2}$ to $10^{-1}$ millibar. From this enclosure, the gas is metered by means of a piezoelectric valve into the analyzing chamber of a quadrupole mass-spectrometer. Several units operating in the field, directly over the volcanic vents, may be connected to a central data processing station, so as to derive useful correlations for predicting future volcanic activity, for monitoring geothermal sources, and for detecting gas-release anomalies for purposes of geophysical exploration.

6 Claims, 1 Drawing Figure

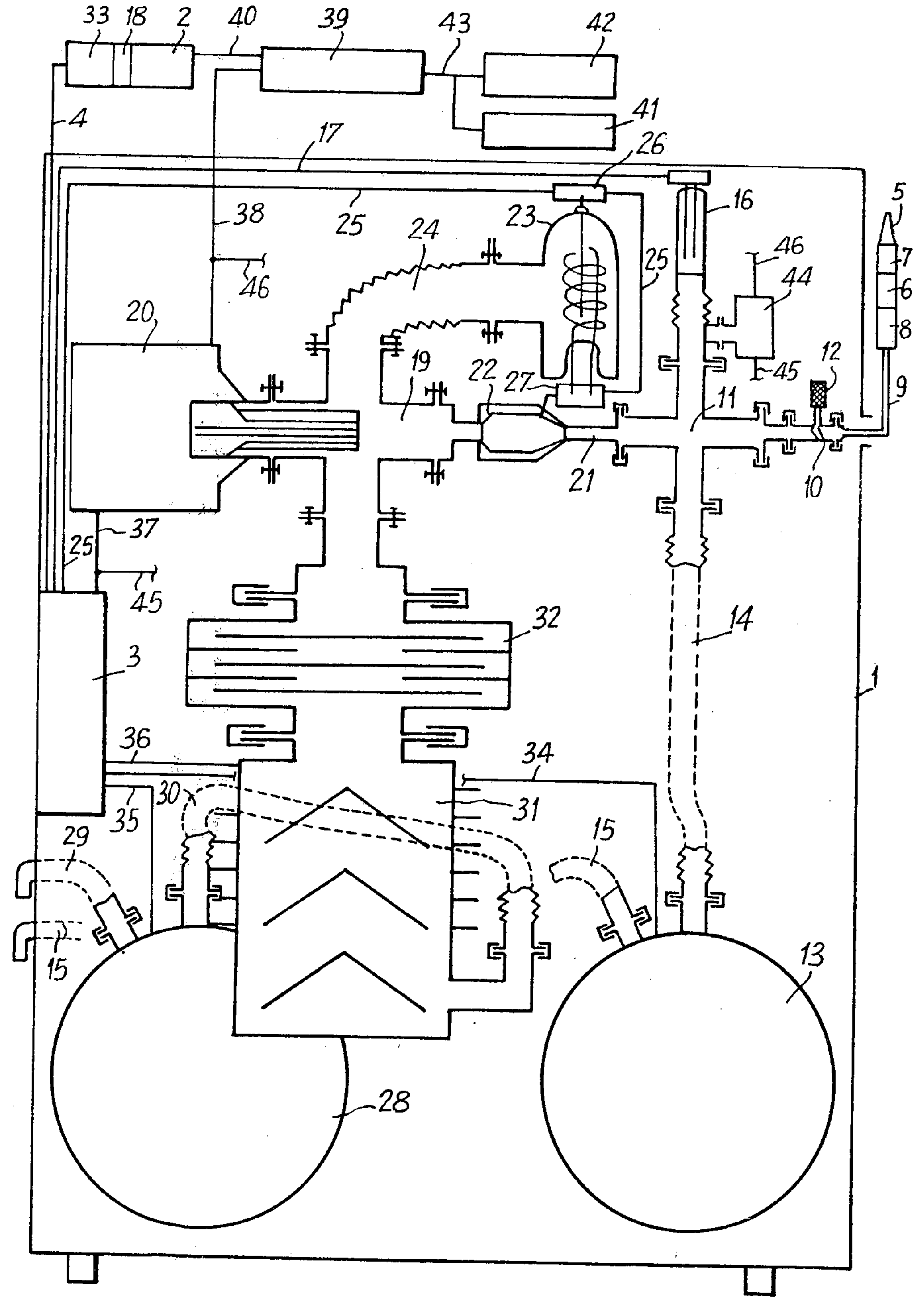
33
18
2
40
39
43
42
41
4
17
26
25
16
5
38
23
24
46
25
7
44
6
20
8
45
12
19
22
27
11
9
21
10
37
25
45
14
32
3
1
36
34
30
31
35
29
15
15
13
28

HIGH-PRECISION METHOD AND APPARATUS FOR IN-SITU CONTINUOUS MEASUREMENT OF CONCENTRATIONS OF GASES AND VOLATILE PRODUCTS

This invention relates to a high-precision method for in-situ and continuous measurement of concentrations of gases and volatile products. The invention also relates to an apparatus for carrying out this method with a mass-spectrometer.

BACKGROUND OF THE INVENTION

Measurement methods are known, by means of wich variations in the concentrations of gases may be monitored, the measurements being continuously carried out in a laboratory. However, these measurements can only concern gases at atmospheric pressure or at lower pressures, while there is no difficulty in using any known type of apparatus for carrying out such measurements.

When, on the contrary, the purpose is to investigate very small variations in the concentrations of gases which may also carry along volatile products, while these gases present themselves at varying pressures, no means are available for continuously carrying out such measurements in the field over a long period. This is particularly so when investigating gases emanating from volcanoes, where the pressure of such gases may be considerable while fluctuating over a very wise range.

Devices are known which are capable of sampling gases from volcanic sources for measuring their concentrations by means of gas-phase chromatography, but these devices do not lend themselves to continuous measurements.

Also, while these devices have detection thresholds of about 50 ppm in the field and from 15 to 20 ppm in the laboratory, they are not sufficient for measurements which aim at predicting possible volcanic eruptions, since they are unable to detect either very small deviations in concentrations or the appearance of a new component appearing at a very low concentration. Now, this detection is indispensable for discovering and measuring gaseous components released through leaks from deep layers located for instance at some 30 kilometers below the surface, while these leaks may be affected by atmospheric and hydrological factors according to cycles, the evolution of which can only be determined by systematic continuous measurements over an extended period.

Briefly stated, methods are known for measuring with a high precision the variations in the concentrations of gases, for instance by means of a mass spectrometer, but then the measurements can only be made in a laboratory with bulky equipment, or otherwise methods are available for in-situ measurement of these variations, but then measurements are not continuous and are not precise enough for detecting small concentrations.

SUMMARY OF THE INVENTION

This invention concerns a high-precision method for measuring concentrations of gases and volatile products emanating from any natural site or any other source, which comprises the steps of continuously sampling over very long periods of time the gases in which variations of concentrations are to be measured, while introducing the collected sample of gaseous mixture into a low-outflow circuit, bringing this circuit into communication with an expansion enclosure in which the pressure is brought down to a value of about $10^{-2}$ to $10^{-1}$ millibar while automatically controlling the flow of gas into this enclosure, and allowing the expanded gas to flow from this enclosure into the analysing chamber of a mass spectrometer while regulating the gas flow from said enclosure into the analysing chamber and maintaining said chamber at a stable and very low pressure of about $10^{-8}$ to $10^{-7}$ millibar.

An advantageous feature of this method is that it makes it possible to achieve continuous measurements, with a precision of about 2 ppm, of the concentrations of gaseous or volatile components from any source, irrespective of their flow rate and pressure, whether very small emanations or large leaks with a pressure which may be as high as 5 bar, for instance.

More particularly, when a volcanic site is to be monitored, measurements of variations in the concentrations of various components are made at any desired locations, so that every possible correlation can now be rigorously investigated in order to establish forecasts of possible eruptions. Until now, no permanent method was available for making a forecast of such risks.

The apparatus for carrying out the method according to the present invention comprises a semi-flexible probe made of stainless metal, linked through a duct having a small flow rate to an expansion enclosure which is connected on the one part to a gas-transfer pump and on the other part to a pressure gauge measuring the pressure in said enclosure, a servo-valve controlling the flow into said enclosure, a piezo-electric valve connecting said expansion enclosure to the analysing chamber of a mass spectrometer, said piezo-electric valve being controlled either by an ion gauge measuring the pressure in the analysis chamber or else by the spectrometer itself.

Irrespective of the pressure of the gases being permanently fed to the apparatus, it is therefore possible to regulate the gas flow into the analysing chamber of the mass spectrometer in a very precise manner, so that any small variations in the concentrations of the gas components may be permanently evaluated as soon as they occur, since the time lag in the response of the measuring apparatus is minimized. This reduction of the time lag is obtained through the use of automatic valves for controlling the flow of gases through the apparatus, whereas prior methods and devices relied upon the use of long capillary tubes for bringing down the gas pressure to a specified level. These capillary tubes introduced a substantial time lag which affected the response time of the apparatus.

According to a preferred embodiment of the invention, the mass spectrometer forming part of the apparatus is of the quadrupole type, which makes it possible to assemble the whole apparatus, including the evacuating pumps, within a weather-proof enclosure having small dimensions, while the measurements delivered by the mass spectrometer are transmitted by means of cables or by radio to any data processing station located away from the measurement site.

This makes it possible to use this apparatus on any site which would be difficult to reach otherwise, in the field or within industrial plants, since the equipment is easily carried aboard any light vehicle.

Further features and advantages of this invention will become apparent from the following detailed description taken in conjunction with the appended drawing which represents as a non-limitative example one embodiment of the apparatus for carrying out the method of the invention.

DETAILED DESCRIPTION OF THE DRAWING

The single FIGURE of the drawing is a block-diagram showing the schematic set-up of the measuring apparatus within its protecting enclosure, and of its connections with external elements.

The apparatus is contained within an enclosure 1 which may have any suitable shape corresponding to the conditions in which the apparatus is to be used. Preferrably, this enclosure is weather-proof and has the shape of a parallelepiped with small dimensions, this being made possible by the above-described features of the invention. Enclosure 1 is connected, through any suitable means, to a remotely located control station 2 comprising a power-supply unit connected to enclosure 1 by a junction box 3 and a multiple cable 4, so as to supply the various voltages required by the various elements of the apparatus.

A gas-sampling probe 5 is shown diagrammatically. This probe is permanently introduced into a suitable vent in the ground. The gas collected by this probe is fed to the apparatus through a semi-flexible duct 6, made of stainless metal. The upstream tip of this duct is provided with a breather vent and with a filter 7. A trap 8 may also be provided for retaining water and carbon dioxide. Means, not shown, may further be provided for heating the probe assembly to a temperature of 120° C., for instance. An extension 9 of duct 6 is provided for feeding the sampled gas through the input 10 of the apparatus to an expansion enclosure 11. A valve 12, which may be a needle valve or any suitable type of servo-valve, is provided for regulating the gasflow into enclosure 11 so as to maintain a low regulated pressure within this enclosure. This pressure is preferably comprised between $10^{-2}$ and $10^{-1}$ millibar and is precisely regulated in order to achieve a good reproducibility of the measurements.

This pressure regulation is obtained by means of a vacuum pump 13 connected to the expansion enclosure 11 through a duct 14. This gas-transfer pump is preferrably a two-stage unit of the rotary-vane type, with a flow rate capacity of about 4.5 $m^3$ per hour, or less, according to the applications considered. Exhaust gases are evacuated to the exterior of enclosure 1 through an exhaust pipe 15. A pressure gauge 16, which is for instance of the "Pirani" type, energized through wires 17, delivers a pressure signal which is displayed on indicator 18 at the control and monitoring station 2. This station 2 may also be provided with manual or automatic control means for controlling input valve 12 so as to maintain a constant pressure of about $10^{-2}$ to $10^{-1}$ millibar within enclosure 11.

The expansion and transfer enclosure 11 is connected to the analysing chamber 19 of the mass spectrometer 20 through a duct 21 controlled by a piezo-electric valve 22. This valve is automatically controlled by an ion gauge 23 linked to the analysing chamber 19 through a metal duct 24. Alternatively, this piezo-electric valve 22 may be directly controlled by the spectrometer itself. Ion gauge 23 and valve 22 are energized through cable 25 and controls 26 and 27, the latter comprising a feed-back circuit, shown diagrammatically, which may be of any appropriate known type. Operation of feed-back circuit 27 is controlled as a function of the pressure in the analysing chamber 19 so as to cause the flow of expanded gases from enclosure 11 to the analysing chamber 19 to vary for maintaining within this chamber a stable pressure of about $10^{-7}$ to $10^{-8}$ millibar. Circuit 27 is also operative for closing down valve 22 so as to cut off any communication from enclosure 11 to analysing chamber 19 in order to ensure complete safety of the apparatus, particularly when a faulty operation of some element might affect the filament of spectrometer 20. Valve 22 also remains closed whenever the apparatus is in a stand-by condition between two sets of measurements when these are being made intermittently.

Analysing chamber 19 of the spectrometer is evacuated by means of a primary vacuum pump 28 which may be of the same type as transfer pump 13. This pump 28 is connected by a duct 29 and a junction 30 to a high-speed pump 31 which is preferrably of the oil-diffusion type, or alternatively a turbomolecular unit. Pump 31 may for instance comprise three diffusion stages, with a flow rate of about 250 liters per second, or may alternatively be a turbomolecular pump capable of evacuating large volumes of gases from analysing chamber 19 to the outside, via the primary pump 28. When pump 31 is of the oil-diffusion type, a baffle 32 is provided for preventing retro-diffusion of oil, and a ventilator is provided for cooling this pump.

Control station 2 is provided with a set of control and display means 33, from which operation of pumps 13, 28 and 31 may be controlled and monitored, while these pumps are driven by electric motors energized respectively through cables 34, 35 and 36. Control station 2 also comprises means for controlling and monitoring the ion gauge 23 of the spectrometer 20, the feed-back circuit 27 which controls piezo-electric valve 22, and also the "Pirani" gauge 16, its feed-back circuit 17, and the primary valve 12.

Measurements delivered by the quadrupole mass-spectrometer 20, which is energized through cable 37, are transmitted over cable 38 to a data processing unit 39, which may in turn be linked to control station 2 by a cable 40, and to any suitable display devices 41 or print-out units 42 by a cable 43. This data processing unit 39 may be either digital or analog, and may be located at any suitable distance away from the measurement site.

This arrangement makes it possible, however difficult the access to the selected site, to locate cabinet 1 in closest vicinity to this site, thanks to the small dimensions of the cabinet, which may be for instance 40×50×60 cm or less, and then to proceed with measurements of very small gas concentrations, so as to detect variations of components such as $H_2$, He, $CH_4$, $NH_3$, etc . . . contained in a large volume of $H_2O$, $CO_2$, $N_2$, the apparatus described hereinabove having a sensitivity of about 2 ppm for the abundance of the component investigated.

When the apparatus has been installed on the site, it operates in an autonomous manner, being permanently controlled by control station 2 which may in turn be controlled by the data processing system 39. It will then be possible, taking into account the results obtained, to proceed with repetitive cycles of samplings through the ground probe 5 and of admissions of gas into the analysing chamber 19 through the expansion enclosure 11, according to variable cycle frequencies. The response time of the apparatus may be very short, since on the one hand its small dimensions lend themselves readily to an installation in very close proximity to the vent selected, and since on the other hand the operation of valves 12 and 22 eliminates the need for connecting the measuring apparatus to the ground probe 5 by a capillary tube extending along the full distance from this probe to the apparatus.

When it is desired to detect variations in the concentrations of gases emanating from volcanic emergences, the method and apparatus of this invention lend themselves readily to a systematic and permanent on-site analysis of gases such as $H_2$, He, $CH_4$ with mases 16, 15 and 14; $NH_3$ with masses 17, 16 and 15; $H_2O$ with masses 18 and 17; Ne with masses 20 and 22; $N_2$, $O_2$, $H_2S$ with masses 28, 32 and 34; HCl with masses 36 and 38; Ar, $CO_2$ with masses 44 and 48; $SO_2$ with masses 64 and 68, etc . . .

When a complete industrial plant, or an extensive volcanic area, is to be monitored, a single data processing unit 39 may be connected to several measuring cabinets 1, each one of which will be permanently analysing the gases emanating from an adjacent source.

The method and apparatus according to this invention may also be used for monitoring gases released from geothermal bore-holes and for detecting anomalies of gases in geothermal drillings or in mining exploration works. The apparatus may then also comprise a scintillation detector 44 for the detection and simultaneous measurement of radon. This detector may be connected in any appropriate manner to the transfer and expansion enclosure 11. Detector 44 is energized by a wire 45, while its output is delivered via a second wire 46.

The invention is not to be limited to the details herein set forth, but will be of the full scope of the appended claims.

I claim:

1. In a high-precision method for measuring in situ concentrations of gases and volatile products emanating from any natural or industrial source at a varying flow rate and at a varying pressure above atmospheric pressure before being fed to a mass spectrometer via an input duct and an intermediary expansion closure while maintaining optimal pressure values within said spectrometer and said expansion enclosure by means of vacuum pumps, the method comprising the steps of:
   continuously sampling over very long periods of time the gases in which variations of concentrations thereof are to be measured;
   introducing the gases into the expansion enclosure;
   automatically controlling the rate of flow of the gases into the expansion enclosure to maintain therein a constant pressure between about $10^{-2}$ and $10^{-1}$ millibar by means of: a pressure-limiting valve (12) between said duct and said enclosure (11), and a pressure gauge (16) measuring the pressure in said expansion enclosure for controlling the operation of said valve (12) as a function of said pressure;
   feeding the expanded gas into the analysing chamber of a mass spectrometer; and
   automatically regulating the flow of the gas from the enclosure into said analysing chamber to maintain in said chamber a stable pressure of between about $10^{-8}$ and $10^{-7}$ millibar by means of: a piezo-electric valve (22), between said expansion enclosure (11) and the analysing chamber (19) of said mass spectrometer (20), for controlling the gas flow from said enclosure (11) into said analysing chamber, and means for controlling said piezo-electric valve (22) as a function of the pressure in said analysing chamber.

2. Apparatus for high precision measuring of concentrations of gases and volatile products emanating from any natural or industrial source at a varying flow-rate and at a varying pressure above atmospheric pressure before being fed to a mass spectrometer via an input duct and an intermediary expansion enclosure while maintaining optimal pressure values within said spectrometer and said expansion enclosure by means of vacuum pumps, and collecting over a very long period of time samples of the gases in which time-dependent variations of concentrations are to be measured; said apparatus comprising:
   (a) a sampling probe (5) for collecting gas samples,
   (b) an expansion enclosure (11)
   (c) a pressure-independent duct (9) connecting said probe to said expansion enclosure (11)
   (d) a pressure-limiting valve (12) between said duct and said enclosure (11),
   (e) a vacuum pump (13) for evacuating said expansion enclosure (11),
   (f) a pressure gauge (16) measuring the pressure in said expansion enclosure for controlling the operation of said valve (12) as a function of said pressure,
   (g) a mass spectrometer (20) having an analysing chamber (19),
   (h) a piezo-electric valve (22) between said expansion enclosure (11) and the analysing chamber (19) of said mass spectrometer (20), for controlling the gas flow from said enclosure (11) into said analysing chamber, and
   (i) means for controlling said piezo-electric valve (22) as a function of the pressure in said analysing chamber.

3. Apparatus according to claim 2 wherein said means for controlling said piezo-electric valve (22) comprises an ion gauge (23) measuring the pressure in said analysing chamber (19).

4. Apparartus according to claim 2, in which the gas-sampling probe (5) is a semi-flexible probe made of stainless metal and adapted for being provided with heating means.

5. Apparatus according to claim 2, in which the mass spectrometer (20) is of the quadrupole type and is contained inside a weatherproof portable cabinet (1) provided with a voltage source, said cabinet also containing a primary vacuum pump (28) in series with a secondary pump (31) connected to the analysing chamber (19) of said spectrometer (20), said vacuum pump (13) being connected to said expansion enclosure (11), said control valve (12) controlling the continuous input of gas into said enclosure (11), and said valve (22) controlling the flow from said enclosure (11) into said analysing chamber (19).

6. Apparatus according to claim 2, 4 or 5, in which operations of the components of said apparatus are controlled and monitored from an external control station (2), the output signals from said mass spectrometer (20) being fed to a remotely connected data processing system (39) and the operation of said apparatus is controlled by said data processing system (39) as a function of the data elaborated on the basis of said output signals of the spectrometer (20).

* * * * *